United States Patent [19]

Nola

[11] Patent Number: 4,473,792
[45] Date of Patent: Sep. 25, 1984

[54] COUPLING AN INDUCTION MOTOR TYPE GENERATOR TO A.C. POWER LINES

[75] Inventor: Frank J. Nola, Huntsville, Ala.

[73] Assignee: The United States of America as represented by the Administrator of the National Aeronautics and Space Administration, Washington, D.C.

[21] Appl. No.: 481,086

[22] Filed: Mar. 31, 1983

Related U.S. Application Data

[63] Continuation-in-part of Ser. No. 243,683, Mar. 16, 1981, Pat. No. 4,388,585.

[51] Int. Cl.³ .............................................. H02P 9/00
[52] U.S. Cl. ....................................... 322/47; 322/29; 322/35; 322/95; 307/87
[58] Field of Search ....................... 322/29, 32, 47, 89, 322/90, 95, 2 R, 35; 307/87

[56] References Cited

U.S. PATENT DOCUMENTS

| | | | |
|---|---|---|---|
| 3,982,170 | 9/1976 | Gritter et al. | 322/32 X |
| 4,242,648 | 12/1980 | Mohan et al. | 322/47 X |
| 4,388,585 | 6/1983 | Nola | 322/35 X |

FOREIGN PATENT DOCUMENTS

| | | | |
|---|---|---|---|
| 43597 | 3/1982 | Japan | 322/47 |
| 59497 | 4/1982 | Japan | 322/47 |

Primary Examiner—R. J. Hickey
Attorney, Agent, or Firm—Joseph H. Beumer; John R. Manning; Leon D. Wofford, Jr.

[57] ABSTRACT

A coupling system for an induction motor type generator (10) to an A.C. power line (18) wherein an electronic switch means (28) which is controlled by a control system (30) is regulated to turn "on" at a relatively late point in each half cycle of its operation whereby the energizing power supplied by the line (18) to the induction motor type generator (10) is decreased and the net power delivered to the line is increased.

12 Claims, 6 Drawing Figures

COUPLING AN INDUCTION MOTOR TYPE GENERATOR TO A.C. POWER LINES

ORIGIN OF THE INVENTION

The invention described herein was made by an employee of the U.S. Government and may be manufactured and used by or for the Government of the United States for governmental purposes without the payment of any royalties thereon or therefor.

RELATED APPLICATIONS

This is a continuation-in-part application of Application Ser. No. 243,683, filed on Mar. 16, 1981, now U.S. Pat. No. 4,388,585 entitled "Electrical Power Generating System" and assigned to the U.S. Government as represented by the National Aeronautics and Space Administration.

TECHNICAL FIELD

This invention relates to electrical power generation, and particularly to an auxiliary generating system for coupling an induction motor type generator to an A.C. power line for adding power to that line.

BACKGROUND ART

In the past few years, there has been a considerable effort to develop new sources of electrical power. Included has been the development of systems primarily designed for providing power to a single enterprise, for example, a household, with any excess generated power being fed back to a power line of a public utility providing a primary source of power for that household. Frequently, the auxiliary or local power generating unit is in the form of a windmill, and there are times when little or insufficient power is available from it alone. Thus, as a matter of convenience, in order to reserve a continuous interconnection of power to on-site electrical devices to be powered, the windmill and public utility power lines are connected together.

Windmill generators have typically been of the direct current type, and thus in order to achieve compatibility with public power lines, which are of alternating current power, the output of such a generator must be converted to alternating current power. This is accomplished by switching means operating synchronously with the frequency, typically 60 cycles, of the power line. In addition to effecting frequency compatibility, there must be both voltage amplitude and phase compatibility between the generated output and the power line voltage. All in all, such a coupling system is necessarily complex and costly.

As an alternate to the direct current generator, induction motor/generator units are sometimes used with windmill generating systems. While the induction motor/generator has not seen great use as a generator in the past, it is perhaps the most widely used type of motor, and thus is widely available and at a reasonable cost.

The power input to an induction motor is given by the product of the applied voltage, the current, and the cosine of the phase angle between the voltage and current (E I Cosine a). In a heavily loaded motor, the current will tend to be in phase with the voltage. When unloaded, the current will typically lag the voltage 70° to 80°. If an external force tends to drive the shaft higher than synchronous speed, the phase lag will continue to increase. When the force is sufficient to cause the phase lag to be 90°, the power input to the motor is zero since cosine 90°=0. At this point, the mechanical energy applied to the shaft is exactly equal to the magnetizing losses, and there is no net energy being returned to the A.C. buss. As the driving force continues to increase, the phase angle becomes greater than 90°. The cosine of angles greater than 90° is negative, indicating negative power flow. The motor is now generating and returning energy to the A.C. buss. Further increase in driving force causes the phase lag to approach 180° as the full generating capacity of the machine is reached.

Significantly, the induction generator requires no synchronization or voltage regulation circuitry to couple its output to a power line. In inherently functions as a generator when it is driven above its synchronization speed, a speed equal to the frequency of the power line divided by the number of pairs of poles that it contains, typically in the United States, the speed being 1,800 rpm in the case of a 4-pole device. It, like a direct current generator, is typically connected to a power line when its speed is sufficient for the production of power which, in the case of the induction motor/generator, is at sync speed. Beyond this speed, and in the range of approximately five percent of the sync speed, this type device provides increasing power output to a power line, this increase occurring as the phase lag of current with respect to voltage increases above 90°, an angle which persists at the sync speed.

Despite the obvious advantages of the induction motor/generator over a D.C. generator as described, the former has one significant disadvantage. It must draw field excitation power from the power line that is connected to it. This excitation current is drawn during a portion of each half cycle of the A.C. line voltage when current and voltage are of the same polarity, which, in the case of a lightly driven generator, is only slightly less than one-half of each half cycle. Thus, in such case, it can only function as a generator during the remaining slightly more than one-half of each half cycle, and thus its net output as a generator is essentially slight. At higher speeds, the ratio of power drawn to power delivered improves.

It is the object of this invention to effectively reduce the portion of each half cycle where current is drawn by the generator, and thus substantially improve its efficiency, particularly at low velocity drive levels which, in the case of windmill operation, may persist for a substantial portion of the time of operation.

DISCLOSURE OF THE INVENTION

In accordance with this invention, an induction motor/generator is mechanically driven and electrically coupled to an A.C. power line through a thyristor or thyristors operated to retard the time of interconnection to a relatively late point in each half cycle of the A.C. line voltage, whereby the energizing power supplied by the line to the motor/generator may be decreased, and thereby the net power delivered to the line may be increased. Typically, a triac would be employed as the thyristor. Alternately, two SCR devices connected in antiparallel may be employed instead.

BEST MODE FOR CARRYING OUT THE INVENTION

Figure 1:
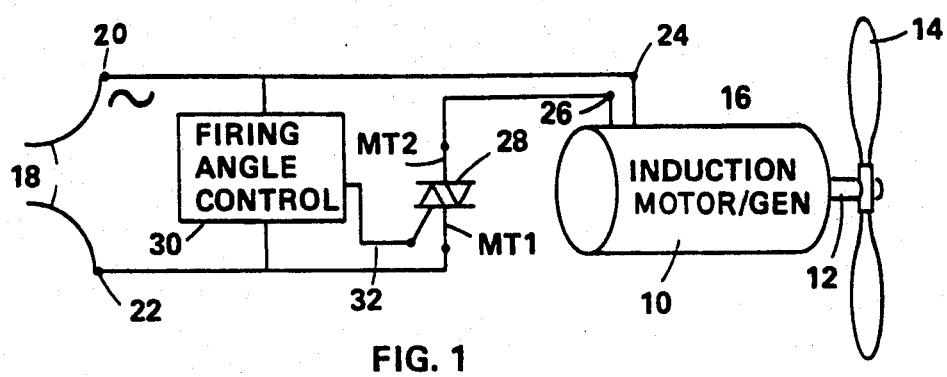
FIG. 1 is a block diagram form showing an embodiment of the invention.

Referring to the drawings, an A.C. induction motor/generator 10 is mechanically driven through shaft 12 by a propeller 14 of a windmill 16. In this illustration, a 115-volt (or other voltage) A.C. power line 18 is coupled to terminals 20 and 22 and thence to the circuit of a coupling system according to this invention. Thus, terminal 20 is connected to one terminal 24 of generator 10, and a second power terminal 22 is connected through triac 28 to terminal 26 of generator 10, connection being via conventional triac power terminals MT1 and MT2. The firing angle for triac 28 is set by a firing angle control 30, which is connected to power line 18 and supplies a trigger voltage to the gate terminal 32 of triac 28.

As a feature of this invention, triac 28 is controlled to be turned "on" at a selected point, a relatively late point, in each half cycle of the A.C. voltage cycle as supplied by line 18. Typically, this voltage is at approximately 150° into each half cycle. From this point, and until the 180° point when the line voltage passes through zero, the power line actually supplies an energizing field current to generator 10 to enable immediately following operation as a generator during a portion of the next half cycle. The turn "on" point is set no later than needed to effect generator operation for the particular generator used. Thus, power drain by the generator is minimized.

Most significant in the present invention is the applicant's utilization of the characteristic of the triac or SCR electronic switch thyristor to turn "off" only after current goes through zero following a turn "on" of the thyristor as described. Significantly, this zero crossing by the current occurs when the generator ceases to deliver power to the line after which point the generator would consume power. Thus, there is achieved an automatic optimum control of the period of coupling between the line and generator.

Figure 2:
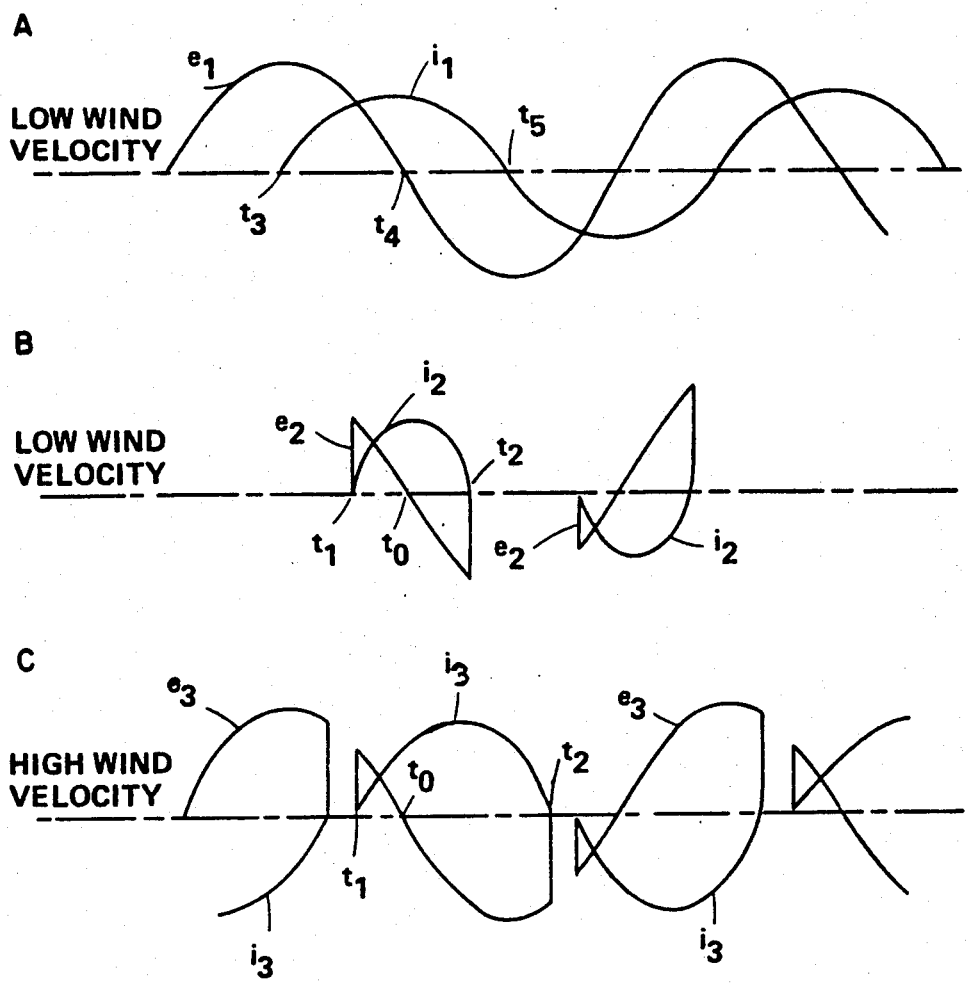
FIG. 2 is a graphical waveform presentation of characteristics of operation of the system of FIG. 1.

The operation described will be better appreciated by reference to the waveforms shown in FIG. 2 illustrative of the employment of induction motor/generator 10 with and without the present invention. Waveform A, which will be first examined, are illustrative of windmill operation for a relatively low wind velocity and for the conventional case where triac 28 is omitted and generator 10 and power line 18 are directly connected. Curve $e_1$ is representative of line voltage of A.C. power line 18. Curve $i_1$ is illustrative of current flow between an A.C. power line and an induction motor/generator.

Waveform B of FIG. 2 illustrates, comparatively, the electrical operation of a system constructed in accordance with the present invention as illustrated by the circuit of FIG. 1, and wherein operation is for a like (low) wind condition to that depicted by waveform A. In the applicant's system, triac 28 is keyed "on" at approximately the 150° point $t_1$ in each half wave voltage cycle of power line 18 as described above. Voltage curve $e_2$ is illustrative of the voltage present on generator 10. Current curve $i_2$ is illustrative of current flow concurrent with voltage, both terminating at point $t_2$ during each half cycle.

Significantly, it is to be noted with respect to waveforms A and B that when current and voltage are of a like polarity, power is being extracted from the line by a generator to energize its field; and when current and voltage are of an unlike polarity, the generator functions to furnish power back to the line.

To examine first the operation of the conventional case, and with reference to waveform A, it is to be noted that power is supplied by a power line to an induction motor/generator from time point $t_3$ to time point $t_4$, and power supplied by the generator to the power line from time point $t_4$ to time point $t_5$. By examination of the curves during the two intervals, it is to be appreciated that there would occur only a slightly greater magnitude of power flow (current times voltage) from the generator to the line than from the line to the generator. Thus, there is little net power supplied to the line.

In contrast, by the the employment of the applicant's system, with the same wind velocity, the power supplied the line by the generator exceeds the power consumed by a greater margin. This is illustrated in waveform B by comparing the combination of voltage and current curves $e_2$ and $i_2$, respectively, for the power consumption interval from time point $t_1$ to time point $t_0$ and the power generation interval from time point $t_0$ to time point $t_2$.

Waveform C illustrates by voltage curve $e_3$ and current waveform $i_3$ operation of the system shown in FIG. 1 for a relatively high wind velocity condition. Here, as will be noted, the energization period for the windmill is the same as shown in waveforms B, from time point $t_1$ to time point $t_0$, but the power generation portion from $t_0$ to the end of the current half cycle $t_2$ is significantly expanded.

The applicant has not attempted to detail requirements for driving an induction motor/generator at a range just above its synchronization speed, as such arrangements may vary substantially. It is to be understood, however, that depending upon the optimum operating speed of the drive element, e.g., propeller 14, there would be appropriate gearing between the drive element and the shaft of the induction motor/generator.

The present invention has its principal effect in improving efficiency when the generator is driven, in the lower portion of its speed range, as in the case of windmill operation depicted in waveforms B. It enables a lower threshold of windmill speed for power generation, and in its lower velocity range of operation, it enables a greater electrical output. Considering now that in many installations environmental winds are less than maximum most of the time, it is to be appreciated that the present invention provides a valuable contribution to the art.

Figure 3:
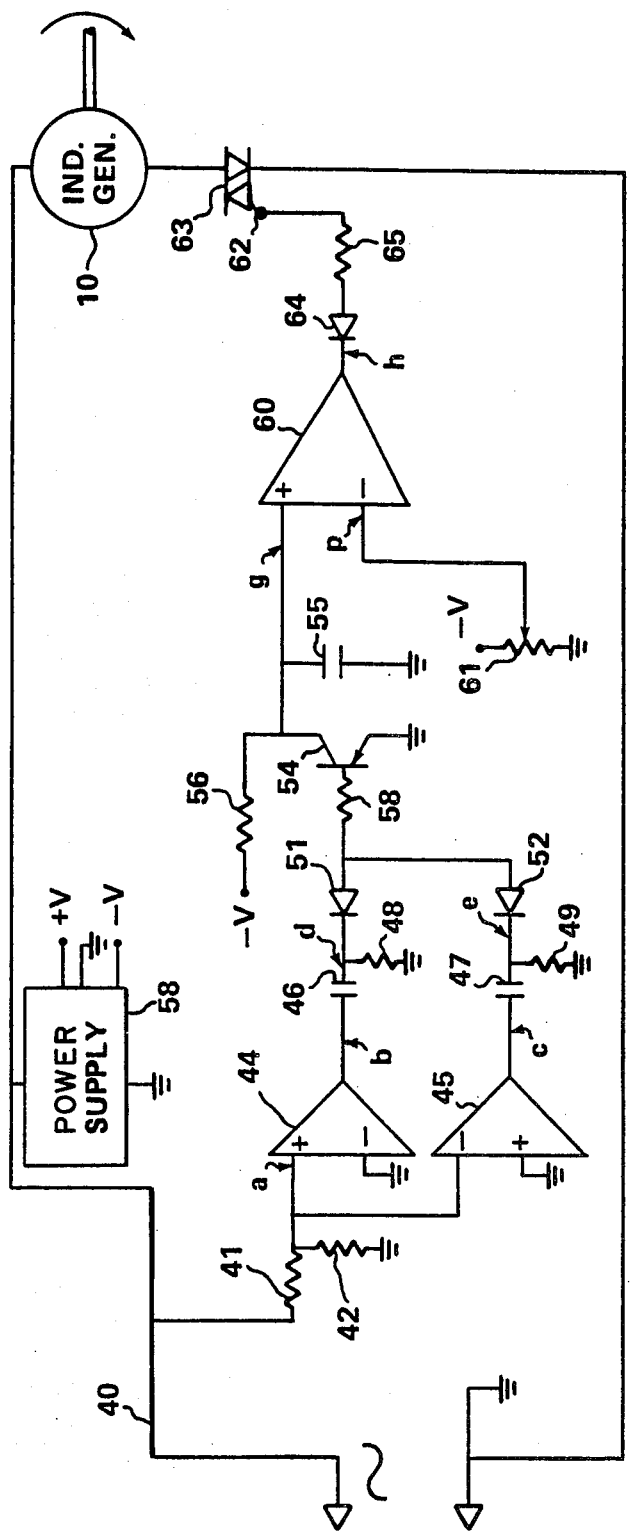
FIG. 3 is a schematic of the circuit for the firing angle control system.
Figure 4:
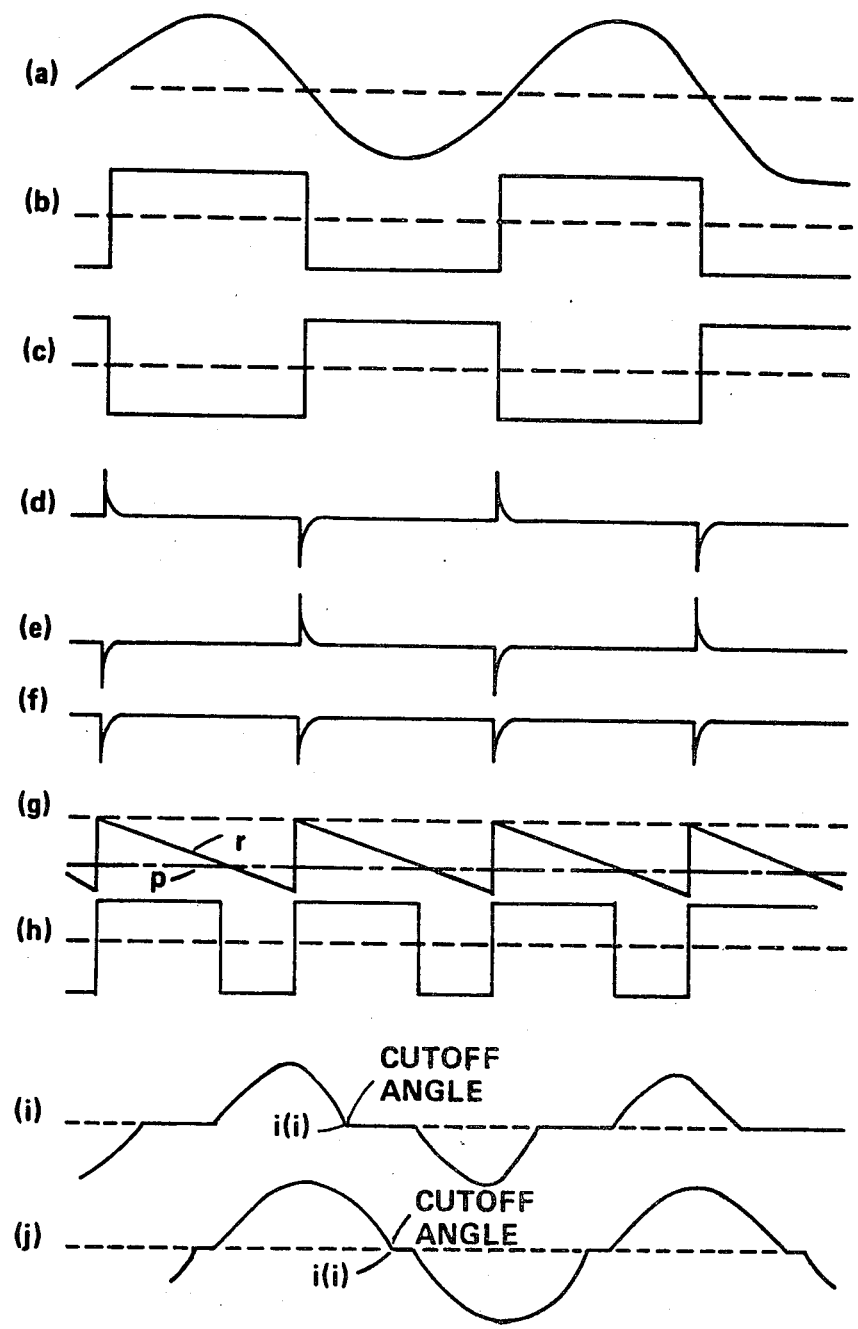
FIG. 4 is a graphical waveform presentation showing the operation of the control system of FIG. 3.

FIG. 3 shows a firing angle control suitable for system 30 of FIG. 1 and FIG. 4 shows the various waveforms present in the system. The input line 40 has an A.C. voltage, waveform (a) of FIG. 4, and is typically 115 or 230 volts at 60 hertz which is applied after a suitable voltage level reduction by two resistors 41, 42, to two high gain operation amplifiers 44 and 45. The amplifiers 44, 45, by detecting the zero crossings of the line voltage, produce the two square wave outputs (b) and (c) of FIG. 4. The line voltage is applied to the non-inverting plus input of amplifier 44 which provides an in-phase wave output, and also is applied to the inverting minus input of amplifier 45 to provide an inverse phase output. The capacitors 46, 47 are resistors 48, 49, differentiate the amplifier outputs to provide trigger pulses of waveforms (d) and (e) of FIG. 4.

Diodes 51, 52, reject the positive trigger pulses and pass only the negative trigger pulses as shown by waveform (f) of FIG. 4. During the periods in between the negative trigger pulses, transistor 54 is off and capacitor 55 is charging through resistor 56 toward minus voltage supplied by power supply 58. At each zero crossing of the line voltage, the negative trigger pulses of waveforms (f) of FIG. 4, applied to the base of transistor 54 through current limiting resistor 58, turns the transistor 54 "on" which instantaneously discharges capacitor 55 which results in a ramp voltage r of waveform (g) of FIG. 4, which is synchronized with the line voltage.

The ramp voltage r is applied to the positive input of amplifier 60, while an adjustable negative bias voltage p from potentiometer 61 is applied as a command signal to the negative input of amplifier 60. The bias voltage p is shown superimposed on the ramp voltage r in waveform (g) of FIG. 4. When the ramp voltage r is of a lesser value (more positive) than the bias p, amplifier 60 is switched positive as shown by waveform (h) of FIG. 4. The positive output of amplifier 60 is blocked however from the gate 62 of triac 63 by diode 64. When the ramp voltage r is of a greater value (less positive) than bias p, amplifier 60 switches negative and this negative voltage is passed through diode 64 to the gate 62 of triac 63 and switches it "on". Resistor 65 limits the current to the gate 62 of the triac 63. The resulting current to the induction generator 10 is shown in waveform (i) of FIG. 4.

Once the triac is "on", it will inherently remain "on" until its anode to cathode current (motor current) goes to zero. It then goes "off" and will remain "off" until the next negative going voltage from amplifier 60 is applied.

Thus, it can be seen that by varying the bias level negative voltage p with potentiometer 61 the optimum firing angle for supplying the magnetizing current to the induction generator 10 can be achieved. Once the desired firing angle is established, the potentiometer 61 may remain fixed.

As the torque driving the shaft of the induction generator 10 increases, the current phase lag, as previously discussed, with respect to the line voltage inherently increases. Thus, the cutoff angle at point i(i) of waveform (i) of FIG. 4 increases or moves to the right as shown by waveform (j) of FIG. 4.

The inherent action of the triac causes it to remain on for a longer period of time as shown at (j) of FIG. 4. This increases the applied voltage as the driving force is increased and allows more energy to be returned to the line.

Figure 5:
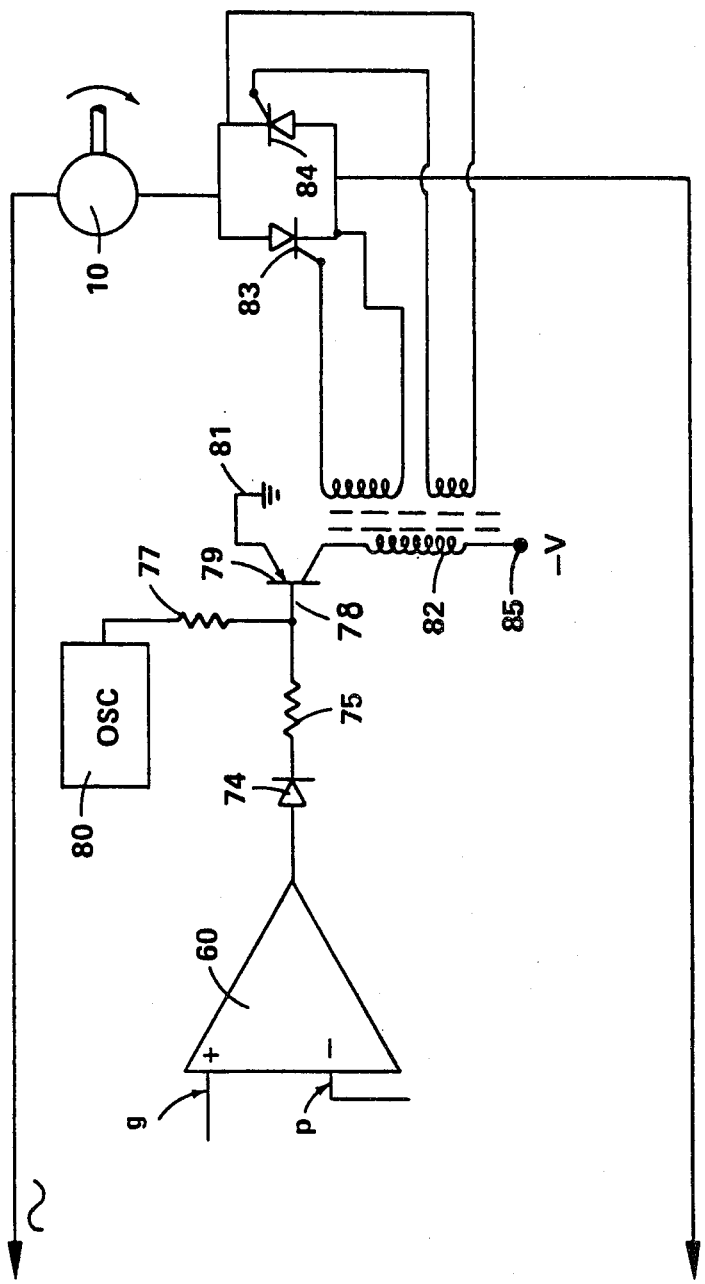
FIG. 5 is a modification of the firing angle control system of FIG. 3 using SCR devices.

The triac of FIG. 4 may be replaced with two silicon controlled rectifiers (SCR) 83, 84, in anti-parallel as shown in FIG. 5. While a triac blocks voltage in both directions and conducts current in both directions, an SCR blocks voltage in both directions and conducts current only in one direction. Hence, two SCR's in anti-parallel connection are equivalent in function to a triac. Once the SCR is gated "on" it will remain "on" until its anode current is zero. As illustrated, anti-parallel connection refers to the SCR's being parallel connected but with their polarities reversed.

Referring to FIG. 5 wherein is shown the amplifier 60 of the circuit of FIG. 3 in which the circuit to the right has been modified for anti-parallel SCR operation. Diode 74 is reversed from the diode 64 of FIG. 3. When amplifier 60 provides a positive output diode 74 is conductive, which positive output is applied to the base of transistor 79 and makes it non-conductive. Resistor 75 is smaller in ohmic value than resistor 77, which makes the junction 78, the base of transistor 79, positive when diode 74 is conductive. When amplifier 60 switches to a negative output at the firing angle, diode 74 blocks the negative signal, and the transistor 70 is switched "on" and "off" by the signals from the high frequency oscillator 80, at the typically 10 Khz rate. When transistor 79 switches on, current is conducted from the negative voltage source 85 provided by the power supply through the primary windings of transformer 82 to ground 81. The voltage generated by the two secondary windings of the transformer 82 are applied, respectively, to the gates of anti-parallel connected SCR's 83, 84, which are thereby gated at the desired firing angle.

Figure 6:
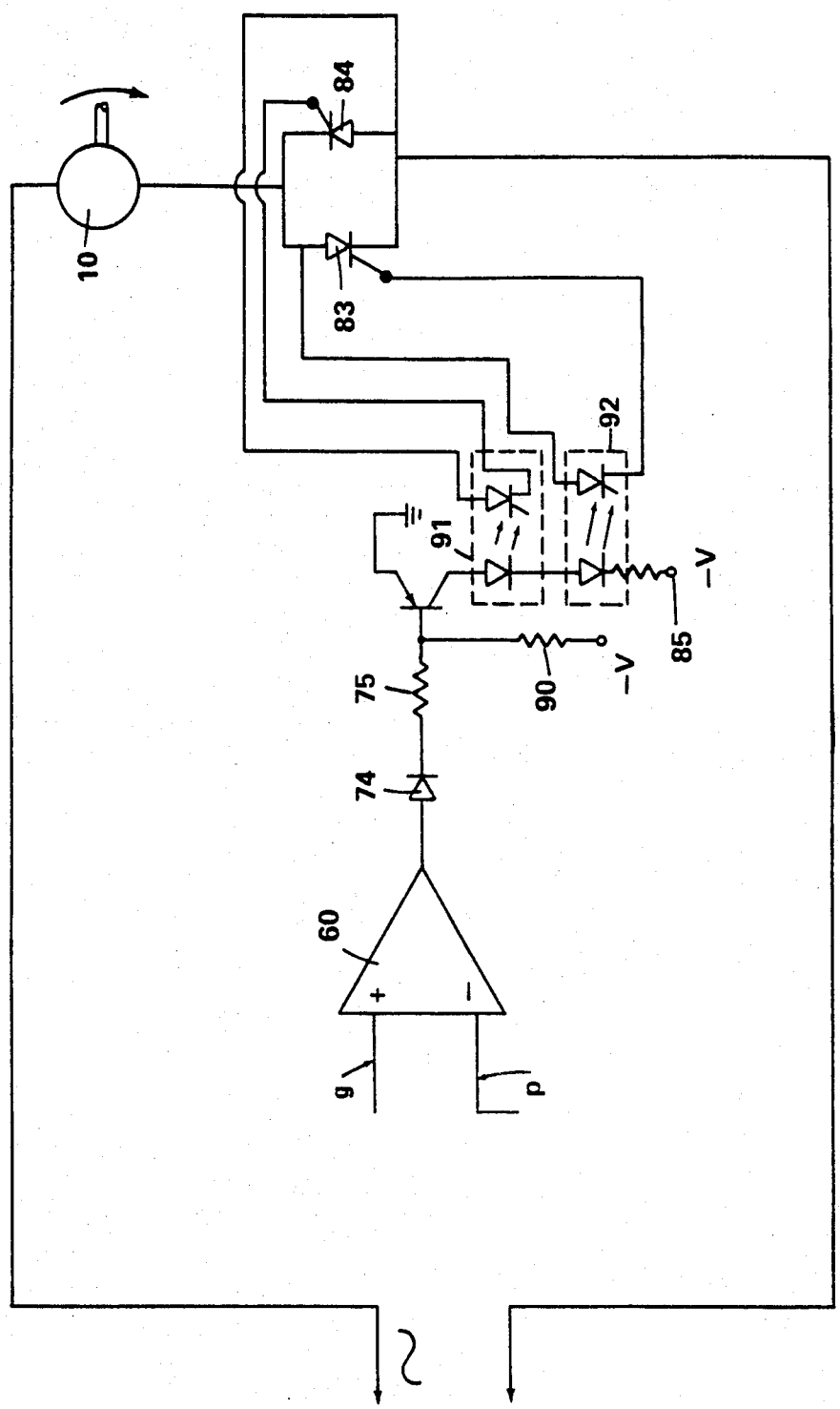
FIG. 6 is another modification of the firing angle control system of FIG. 3 using SCR devices and utilizing photon coupled isolators.

FIG. 6 illustrates a modification in which the transformer 82 of FIG. 5 is replaced with two photon coupled isolators 91, 92 for gating on the anti-parallel SCR's 83, 84. Operation is identical to FIG. 5 except, the oscillator is not needed and resistor 77 is not needed and resistor 44 is replaced with a similar resistor 90 connected to the negative voltage source 85.

The present embodiments are considered illustrative of the invention, and changes and variations may be made without departing from the scope of the claims.

I claim:

1. An electrical generating system comprising:
   an induction motor/generator that is mechanically driven through a shaft;
   means for rotating the shaft of said induction motor/generator;
   an alternating current power supply line;
   electronic switching means electrically connecting said power line to said induction motor/generator so as to transmit power therebetween;
   said switching means adapted to switch on for conduction between said power line and said induction motor/generator in response to a trigger signal and switch off when the current ceases to flow;
   control means for providing a trigger signal to said switching means at a relative late point in each half-cycle of a-c power of said power line whereby the energizing power supplied to said motor/generator will be decreased and thereby the net power delivered to the line from said induction motor/generator will be increased.

2. An electrical generating system as set forth in claim 1 wherein:
   said electronic switching means includes a pair of silicon controlled rectifiers connected in anti-parallel.

3. An electrical generating system as set forth in claim 1 wherein said control means includes:
   a ramp means for producing a ramp voltage output waveform synchronized with voltage of said power line;
   a command means for producing a bias signal;
   operation means for combining said ramp voltage output and said bias signal to produce a positive output signal when said ramp voltage is less than said bias signal and a negative output signal when said ramp voltage is more than said bias signal; and means for applying said negative output to said switching means as a trigger signal.

4. An electrical generating system as set forth in claim 2 wherein said control means includes:

a ramp means for producing a ramp voltage output waveform synchronized with voltage zero crossings of said power line;

a command means for producing a bias signal;

operation means for combining said ramp voltage output and said bias signal to produce a positive output signal when said ramp voltage is less than said bias signal and a negative output when said ramp voltage is more than said bias signal; and triggering means for generating two separate triggering signals in response to one of the signal outputs of said operation means, each triggering signal being applied to a separate silicon controlled rectifier.

5. An electrical generating system as set forth in claim 4 wherein:

said triggering means includes a transformer having two secondary signal outputs.

6. An electrical generating system as set forth in claim 4 wherein:

said triggering means includes two optical isolators for providing said triggering signals.

7. A coupling system for an induction motor/generator to an a-c power line, such induction motor/generator being subject to varying mechanical rotational shaft speeds, comprising:

electronic switching means electrically connecting said a-c power line to said induction motor/generator so as to transmit power therebetween, said electronic switching means adapted to switch on for conduction between said power line and said induction motor/generator in response to a trigger signal and to switch off when the current goes to zero;

control means for providing a trigger signal to said electronic switching means at a relative late point in each half-cycle of a-c power of said power line whereby the energizing power supplied to said motor/generator will be decreased and thereby the net power delivered to the power line from said induction motor/generator will be increased.

8. A coupling system as set forth in claim 7 wherein:

said electronic switching means includes a pair of silicon controlled rectifiers connected in anti-parallel.

9. A coupling system as set forth in claim 7 wherein said control means includes:

voltage signal means producing a signal synchronized with the zero crossings of the line voltage of said power line;

command control means producing a control signal;

amplifier means for producing said trigger signal to said electronic switching means;

said amplifier means receiving said signal from said voltage signal means and said control signal and producing said trigger signal at an optimum point in each half-cycle of a-c power of said power line.

10. A coupling system as set forth in claim 7 wherein said control means includes:

a transformer means for generating two triggering signals;

said electronic switching means includes two silicon control rectifiers parallel connected but in opposite polarity;

and one triggering signal is applied to one of said silicon control rectifiers and the other triggering signal is applied to the other of said silicon control rectifiers.

11. A coupling system as set forth in claim 7 wherein:

said electronic switching means is thyristor.

12. A coupling system as set forth in claim 7 wherein said control means includes:

two photon coupled isolators, each generating a triggering signal;

said electronic switching means includes two silicon control rectifiers prallel connected but in opposite polarity;

and one triggering signal is applied to one of said silicon control rectifiers and the other triggering signal is applied to the other of said silicon control rectifiers.

* * * * *